Patented June 7, 1932

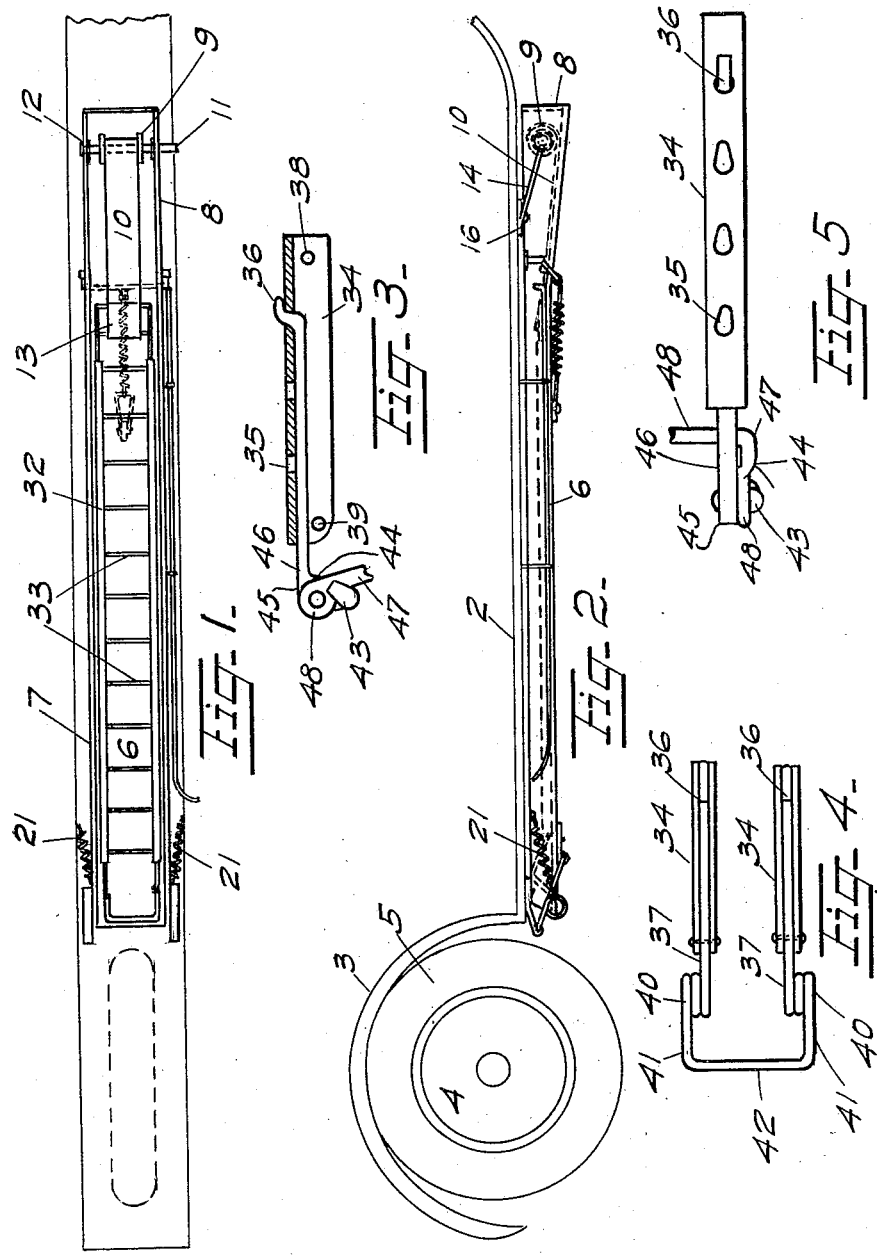

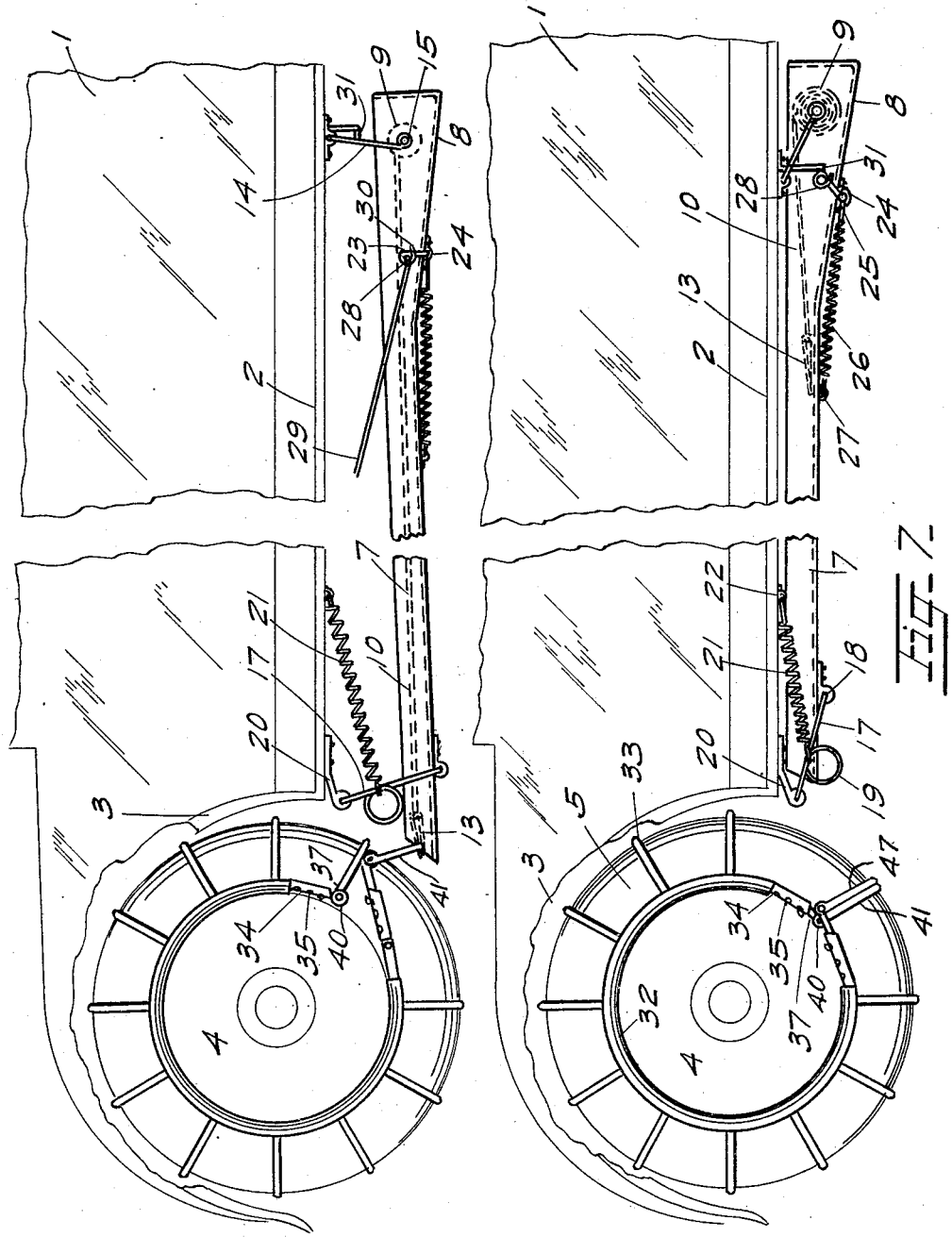

1,862,378

UNITED STATES PATENT OFFICE

ROYAL T. HOWARD, OF REPRESA, CALIFORNIA

SKID CHAIN APPLICATOR

Application filed March 10, 1930. Serial No. 434,528.

The invention is for a skid chain applicator, and has special reference to chains applied to tires to provide traction under slippery conditions.

The application of chains by the usual hand methods is at best an irksome job especially in mud or soft ground, and it is for this reason that applicant's device was evolved.

The main object of the invention is to provide automatic means for applying the skid chains to a tire.

Another object of the invention is to provide skid chains which are in readiness for application at all times, and which may be released when necessity requires, the chains automatically feeding and applying themselves to the tires, the ends automatically locking together when fully applied.

Referring to the accompanying drawings in which:

Fig. 1 is a plan view of the device as installed under the running board of an automobile with the running board removed;

Fig. 2 is a longitudinal elevation of the invention applied to the undersurface of the running board;

Fig. 3 is a sectional view through the chain adjusting member and applied to the follower clamp;

Fig. 4 is a plan view of the leader clamp, showing chain adjusters;

Fig. 5 is a fragmentary plan view of the adjusting member showing the spaced adjusting holes and the locking tongue on the follower clamp.

Fig. 6 indicates the device in released position with the skid chain disposed about the wheel and the ends of the chain at the point of locking; and Fig. 7 indicates the device raised in position against the running board and the chain locked on the tire.

Similar reference characters are used to designate similar parts throughout the several views.

The invention consists primarily of a trough-like device hinged at one end and normally retained against the undersurface of the running board of an automobile. The trough is provided to carry the skid chain which is retained between the flanges of the trough transversely, and laid out in full length, one end of the chain extending to the rearward end of the trough, a clamp member being provided at this end, into which the tire forces itself when the device is released. A somewhat similar member is provided at the opposite end of the chain which also clamps over the tire and coincidently over the first clamp. A spring clamp is fixed to a belt, which in turn is wound on a spool forward of the hinged end of the trough, the spring clamp being clamped over the last end of the chain and providing sufficient resistance to the outward travel of the chain to cause the chain to hug the tire and to cause the chain clamps to interlock, the spring clamp releasing when the chain clamps are locked. The application of the chains merely requires the release of a latch on the trough, the balance of the application being automatic and completed by the turning of the wheel.

An automobile 1 is provided with the usual running board 2, fenders 3, wheel 4 and pneumatic tire 5. These parts do not form a part of the invention, which consists of a trough 6 provided with side flanges 7 and terminating in a trough-like housing 8, in which a spool 9 is transversely pivoted and on which a strap 10 is wound. The spool 9 is provided with a shaft 11 passing through the side walls of the trough-like housing and provided at the outer end with a square or hex 12 for cooperation with a wrench for winding up the strap 10. The strap 10 is fixed to the spool at one end, and at the opposite end has a spring clamp 13 consisting of one or more superimposed sheets of spring steel formed with a return bend with closed jaws, a loop being provided through and about the bend for attachment of the strap.

The suspension for the trough comprises a yoke 14 provided with eyes 15 cooperating with the shaft 11 exteriorly of the trough, the transverse member of the yoke being hingedly connected to the running board 2 at the forward end by the hinge member 16. The rear end of the trough is connected to the running board 2 by means of a yoke 17, the transverse member of which is hingedly related to the trough as at 18, the legs of the yoke having spring loops 19 formed therein to provide resiliency, and are hingedly connected to two spaced spring hinge members 20. Tension springs 21 are connected to the loops 19 and to the running board at 22.

The releasing device comprises a bell crank 23, pivotally related to the trough 6 at 24, and has a spring cooperating arm 25 to which spring 26 is attached, the opposite end of the spring being attached to the bottom of the trough at 27, the other arm of the bell crank having an eye 28 through which a cord 29 is attached. A latch 30 extends forwardly from the eye 28 and is adapted to cooperate with a catch 31 fixed to the running board 2.

The chain consists of the usual side chains 32 covered with resilient tubing, and provided with the usual cross chains 33. The chain locking arrangement comprises a leader clamp, Fig. 4, consisting of a pair of U-shaped members 34 provided with apertures 35 for cooperation with the tongue 36 of the side arms 37, one end of the U-shaped members being attached to one end of the side chains through apertures 38. A retaining pin 39 prevents detachment of the U-shaped member 34 from the arms 37. A pair of cooperating knobs 40 are formed by twisting the bar as indicated in Fig. 4, continuing into a yoke with legs 41 and bar 42. The follower clamp, Figs. 3 and 5, consists of similar U-shaped adjusting members and side arms, except the side arms 46 terminate with an engaging hook 43 and an eye 45, the yoke legs 47 not being integral with the side arms 46, but hingedly related thereto. The legs of the yoke are also provided with eyes 48 to provide a hinge joint.

The device is normally retained in position under the running board as indicated in Figs. 1 and 2, with the chains disposed therein in orderly arrangement, the clamp 13 being clamped over the transverse bar 42 of the follower clamp, Figs. 3 and 5, with the follower clamp in folded position, and the strap 10 wound on the spool 9. The springs 21 draw forward on the loops 19 and fold the trough 6 toward the undersurface of the running board, the latch 30 engaging with the catch 31, thus positively retaining the trough against the running board 2. A cord 29 is attached in the eye 28 of the releasing lever 23 the opposite end terminating within the body of the automobile within reach of the operator. The latch 30 is in engagement with the catch 31 and retained by the spring 26.

To operate the device, the cord 29 is pulled, releasing the latch 30 from the catch 31; the trough is thus released and permitted to swing to the position indicated in Fig. 6. The leader clamp Fig. 4 is thus thrust against the tire in straddling relation and engages the tire 5 and as the wheel is revolved, the chain is drawn from the trough, wrapping about the periphery of the tire with the clamp 13 attached to the follower clamp Figs. 3 and 5, which provides sufficient tension to open the follower clamp and cause the yoke thereof to straddle and slip over the yoke of the leader clamp, the shoulder 44 engaging the knobs 40 and locking the chain on the tire, further rotation of the wheel pulling the follower clamp from the clamp 13. The weight of the chain having been removed from the trough, the spring 21 draws the trough forward quickly, causing the latch 30 to engage the catch 31.

Having described an operative method of constructing and operating the device, it will be understood that such variations in design, construction and arrangement of parts may be made which are consistent with the appended claims, and that such variations will not detract from the scope or advantages of the invention.

I am aware that automatic chain attaching devices have been made, therefore I do not claim such a combination broadly, but I do claim:

1. An antiskid chain applicator, comprising in combination a trough releasably secured to, and resiliently urged against, the bottom of the running board of a vehicle and swingable longitudinally thereof when released, releasing means for said securing means, an anti-skid chain freely disposed in open arrangement in said trough, said chain being provided with cooperative locking yokes at the opposite ends thereof adapted to engage a vehicle tire, and restraining means resiliently secured to one of said locking yokes for tensioning said chain during application to the tire and engagement of the locking yokes, release of said restraining means and removal of said chain permitting said trough to swing against and be automatically secured to, the bottom of said running board.

2. An anti-skid chain applicator, comprising in combination a trough swingably related longitudinally to and supported by the running board of an automobile by means of links at both ends thereof, an anti-skid chain freely disposed in said trough, cooperating locking yokes at the opposite ends of said chain, said yokes being adapted to transversely engage a tire, restraining means resiliently engaging one of said yokes for tensioning said chain during application and locking to the tire of said chain, and automatic means for releasably securing said trough to the bottom of said running board when said chain is removed therefrom and said restraining means is released from said yoke.

3. An anti-skid chain applicator, comprising in combination a longitudinally swinging trough supported at both ends by means of links connected to the running board of a vehicle and resiliently urged against said running board, releasable means for retaining said trough in position against said running board, an anti-skid chain freely disposed in orderly arrangement in said trough, cooperating locking yoke members secured to the ends of said chain, the yokes being adapted to transversely engage a tire and lock together, and restraining means for resiliently holding one of said yokes and tensioning said chain during application thereof and locking said yokes together, and means for releasing said trough whereby the weight of said chain causes said trough to swing into cooperative relation to said tire whereby the other of said yokes is caused to engage said tire, removal of said chain and release of said restraining means permitting said trough to automatically swing into engagement with the running board and be automatically secured thereto.

4. In combination, a trough resiliently urged forwardly, links swingably connecting the opposite ends of said trough to the running board of a vehicle, an anti-skid chain terminating at both ends in cooperating yoke locking members and freely disposed in said trough, said yokes being adapted to transversely engage a tire, a latch for retaining said trough against the undersurface of said running board, and means for releasing said latch whereby the weight of said chain causes said trough to swing back with the rear end in cooperative relation to said tire and one of said yokes is caused to engage said tire, the chain being wound about the circumference thereof by rotation of said tire, and resilient restraining means resiliently secured to the other yoke for tensioning said chain and causing said yokes to engage each other when said chain is disposed about said tire.

5. In combination, a trough, links disposed at opposite ends of said trough and hingedly related thereto and to the running board of a vehicle whereby said trough may be swung into engagement with the undersurface of the running board of a vehicle or with the rear end thereof in cooperative relation to the tire of a vehicle, a latch for retaining said trough in engagement with said running board, releasing means for said latch, an antiskid chain disposed in said trough and terminating at both ends in cooperating yoke locking members, one of said members being adapted to interlock with the other of said members in spanning arrangement, resiliently detachable restraining means connected with the follow end of said chain, and resilient means for swinging said trough in engagement with said running board when said restraining means is detached from said chain, said cooperating yoke locking members being adapted to transversely engage a tire and engage each other when said chain is applied about a tire.

In testimony whereof I have affixed my signature.

ROYAL T. HOWARD.